US010584807B2

(12) United States Patent
Wentworth et al.

(10) Patent No.: US 10,584,807 B2
(45) Date of Patent: Mar. 10, 2020

(54) EXTRACTION OF DUCTILE PIPE

(71) Applicant: Earth Tool Company LLC, Lake Mills, WI (US)

(72) Inventors: Steven W. Wentworth, Scottsdale, AZ (US); Robert F. Crane, Nekoosa, WI (US); Mark D. Randa, Oconomowoc, WI (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 16/059,637

(22) Filed: Aug. 9, 2018

(65) Prior Publication Data

US 2019/0049040 A1    Feb. 14, 2019

Related U.S. Application Data

(60) Provisional application No. 62/544,111, filed on Aug. 11, 2017, provisional application No. 62/620,642, filed on Jan. 23, 2018.

(51) Int. Cl.
*F16L 1/028* (2006.01)
*F16L 1/06* (2006.01)

(52) U.S. Cl.
CPC .............. *F16L 1/028* (2013.01); *F16L 1/06* (2013.01)

(58) Field of Classification Search
CPC ... F16L 55/18; F16L 1/028; F16L 7/00; E03F 3/06
USPC .............................................. 405/184, 184.1
See application file for complete search history.

(56) References Cited

U.S. PATENT DOCUMENTS

| 4,955,757 A * | 9/1990 | Balling ................... E21B 7/046 173/53 |
| 5,205,671 A * | 4/1993 | Handford .................. E21B 7/30 175/62 |
| 7,032,429 B1 * | 4/2006 | McDougle ........... B21D 41/045 72/326 |
| 7,128,499 B2 * | 10/2006 | Wentworth ............. F16L 1/028 405/184.1 |
| 8,277,147 B2 | 10/2012 | Cilliers |

* cited by examiner

*Primary Examiner* — Sean D Andrish
(74) *Attorney, Agent, or Firm* — Tomlinson McKinstry, P.C.

(57) ABSTRACT

A pipe extraction machine can be used to remove a buried pipe from the ground. The machine has a carriage with jaws that grip the buried pipe. While gripped, the carriage moves relative to a support structure to pull the pipe out of the ground. Jaws are actuated by rotating clamp plates and maintained in opposition by static horizontal grooves. The jaws remain opposed and aligned during rotation of the clamp plates. A pipe shear may remove the pipe one piece at a time. A pipe puller can be used at the back end of the pipe being removed to simultaneously install a new pipe along the same path.

40 Claims, 14 Drawing Sheets

EXTRACTION OF DUCTILE PIPE

FIELD

The present invention relates generally to the extraction of pipe from below the ground.

SUMMARY

The present invention is directed to an apparatus. The apparatus comprises a support structure and a carriage. The carriage is movable relative to the support structure. The carriage comprises a carriage frame and a pipe clamp assembly. The carriage frame comprises a plurality of second slots. The pipe clamp assembly is supported by the carriage frame and comprises a rotatable plate, a first jaw, a second jaw, a first pin, and a second pin. The rotatable plate is characterized by a plurality of first slots. The first pin is disposed through the first jaw, one of the plurality of first slots, and one of the plurality of second slots. The second pin is disposed through the second jaw, one of the plurality of first slots, and one of the plurality of second slots.

DETAILED DESCRIPTION

Methods for crushing ductile pipe and subsequently pulling or extracting said pipe from the ground are shown in U.S. Pat. No. 7,128,499, ("the '499 patent") issued to Wentworth, the contents of which are incorporated herein by reference. In Wentworth and other conventional systems, lever arms provide clamp force for crushing and gripping ductile pipe between opposed jaws. The jaws are urged away from the ground by actuators, extracting the pipe. In compact designs, the clamp force that can be achieved by such lever arms may be in the range of 2.5-4.5 times the thrust force required to extract the pipe from the ground. This requires a coefficient of friction between the jaws and pipe of 0.40 to 0.22 to avoid slippage. These numbers are achievable but the pipe may slip and cause the extraction method to be unsuccessful.

Thus, one limiting factor in such extraction operations is the grip-to-thrust ratio of the apparatus. Strong actuators are no use if the pipe, flattened by jaws, slips from them.

The '499 patent overcame some of these issues through use of a wire rope strand, which would attach through the existing pipe to a product pipe puller at the opposite side of the pipe being extracted. The strand provided an additional pulling force to overcome the initial friction of the surrounding ground. However, the strand would often need to be cut with the extracted pipe during extraction, causing this element to be sacrificial. Cutting the strand, rather than the pipe alone, caused cutting elements to dull prematurely. It is advantageous not to cut through a strand with a blade. Finally, installation of the strand is time-consuming.

The present invention provides an improvement to aid in the elimination of the strand from the system. The machine described herein utilizes a camming clamp mechanism to produce a clamp force much greater than what can be achieved with lever arms. The crushing force may exceed five times the thrust force, and may in fact be 7-10 times the thrust force required to extract the pipe from the ground. Therefore, the coefficient of friction required to avoid slippage drops to 0.14-0.10, a very attainable value. The camming clamp mechanism may apply a force to the pipe of 100-140 tons, with half of the force applied by each jaw.

The load required to break a pipe, often installed for decades, away from surrounding soil, may be as high as 3.5 lbs of force per square inch of pipe external surface area. Upon breakaway, the stress required to continue movement of the pipe drops significantly, perhaps 50%-75%. The high clamp force enables the system to pull a pipe with a length of greater than thirty feet from end to end without the use of a strand. In fact, lengths of greater than fifty feet or greater than one hundred feet may be extracted.

Replacement pipes are optionally installed behind a pipe being extracted. These replacement pipes are often made of HDPE (high density polyethylene). Pipe pullers may be utilized to connect the pipe being extracted to the new pipe so that the new pipe follows the same path as the existing pipe.

Figure 1:
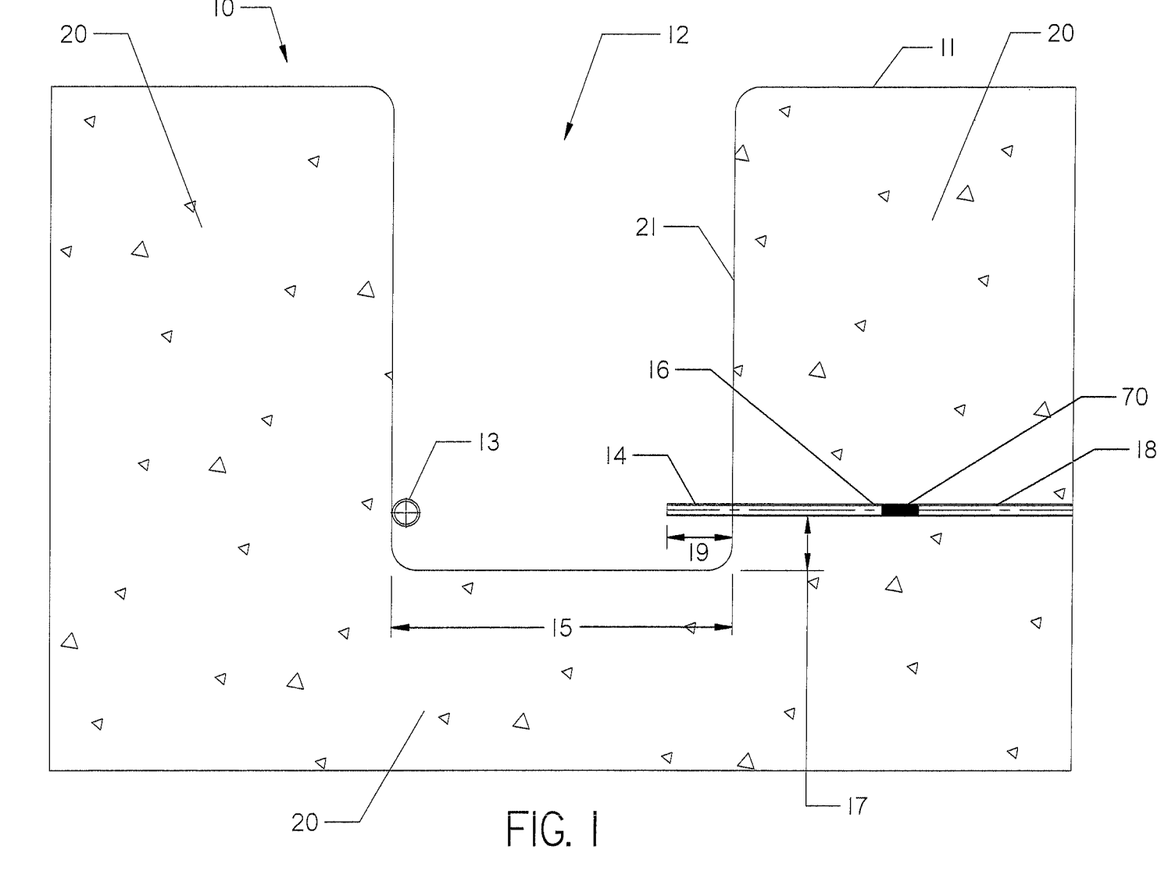
FIG. 1 is a diagrammatic representation of an excavation site.

With reference now to FIG. 1, a typical excavation area 10 for use with the present invention is shown. A pit 12 has been dug below a surface 11 in soil 20. The pit 12 provides access to an underground pipe 14 to be extracted. Often, pipe 14 will be a lateral pipe that was previously connected to a mainline 13. The pit 12 typically has a width 15 that is relatively compact. This necessitates that section of pipe 14 are removed in pieces. The pipe 14 to be replaced extends only a small length 19 away from a face 21 of the pit, and only a height 17 from a floor of the pit. Therefore, an extraction machine should operate in compact environments.

The pipe 14 is connected at its far end 16 to a pipe puller 70. The pipe puller 70 connects the pipe 14 being extracted to a new pipe 18 being installed during the extraction process.

Figure 2:
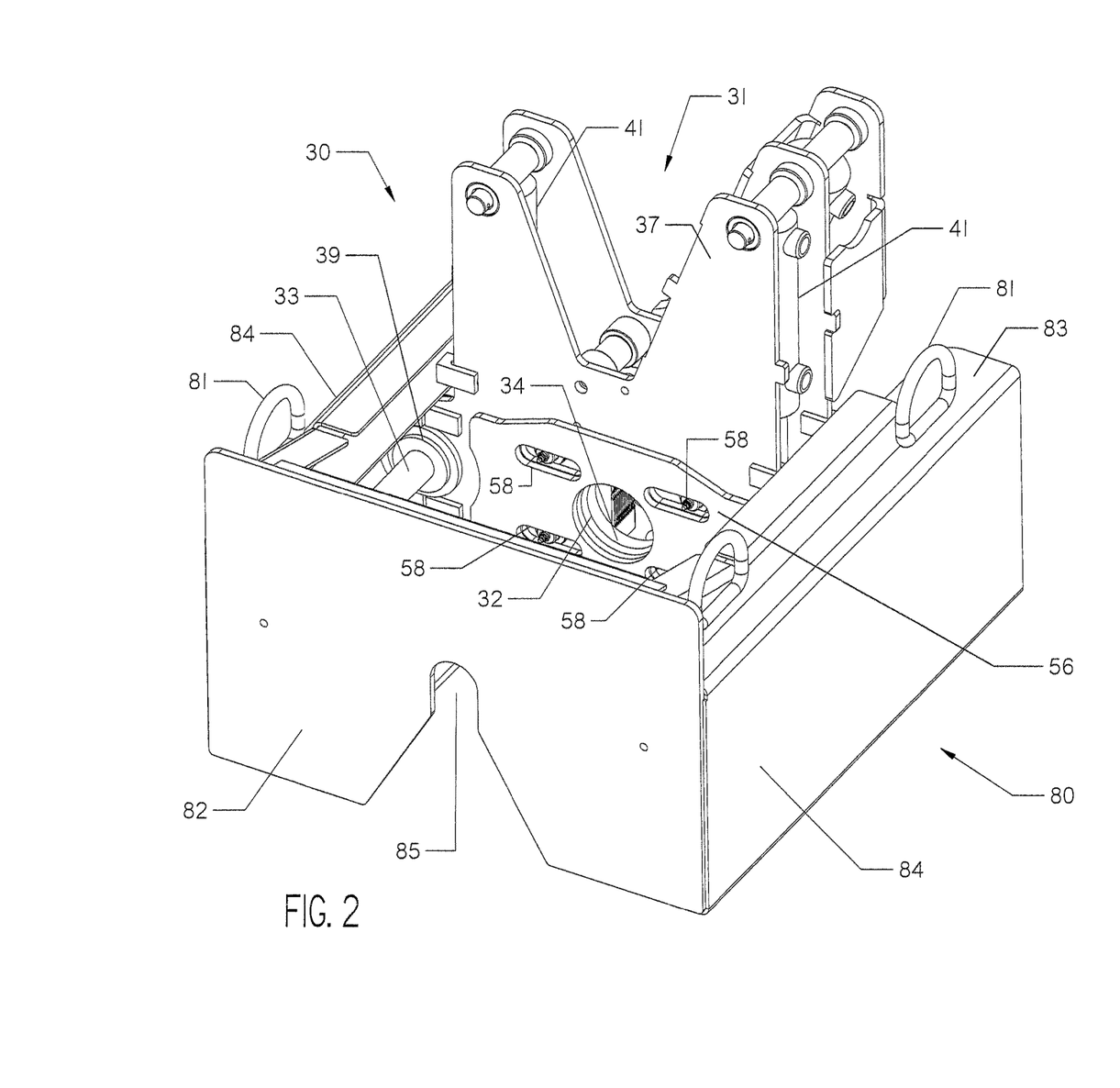
FIG. 2 is a top back left view of an extraction machine.
Figure 3:
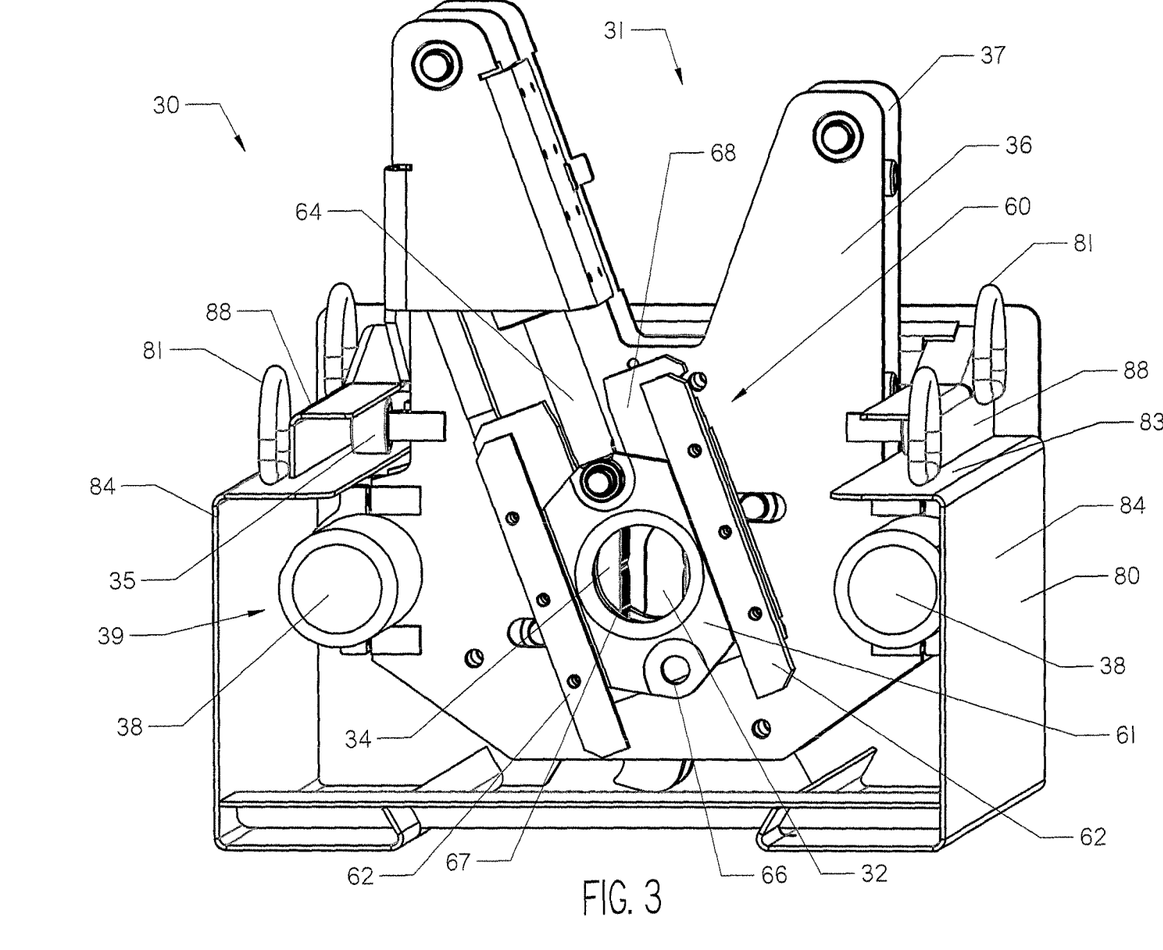
FIG. 3 is a top front right view of the extraction machine of FIG. 2.

The present invention, as shown in FIGS. 2 and 3, is directed to a pipe extraction machine 30. The machine 30 comprises a support structure, referred to herein as a hull 80, and a machine carriage 31. The machine carriage 31 is movable relative to the hull 80 through the extension and retraction of linear actuators 39. The actuators 39 shown are hydraulic cylinders having a rod 33 and a barrel 38, though rack and pinions, screws, or other actuators may be utilized.

Figure 5A:
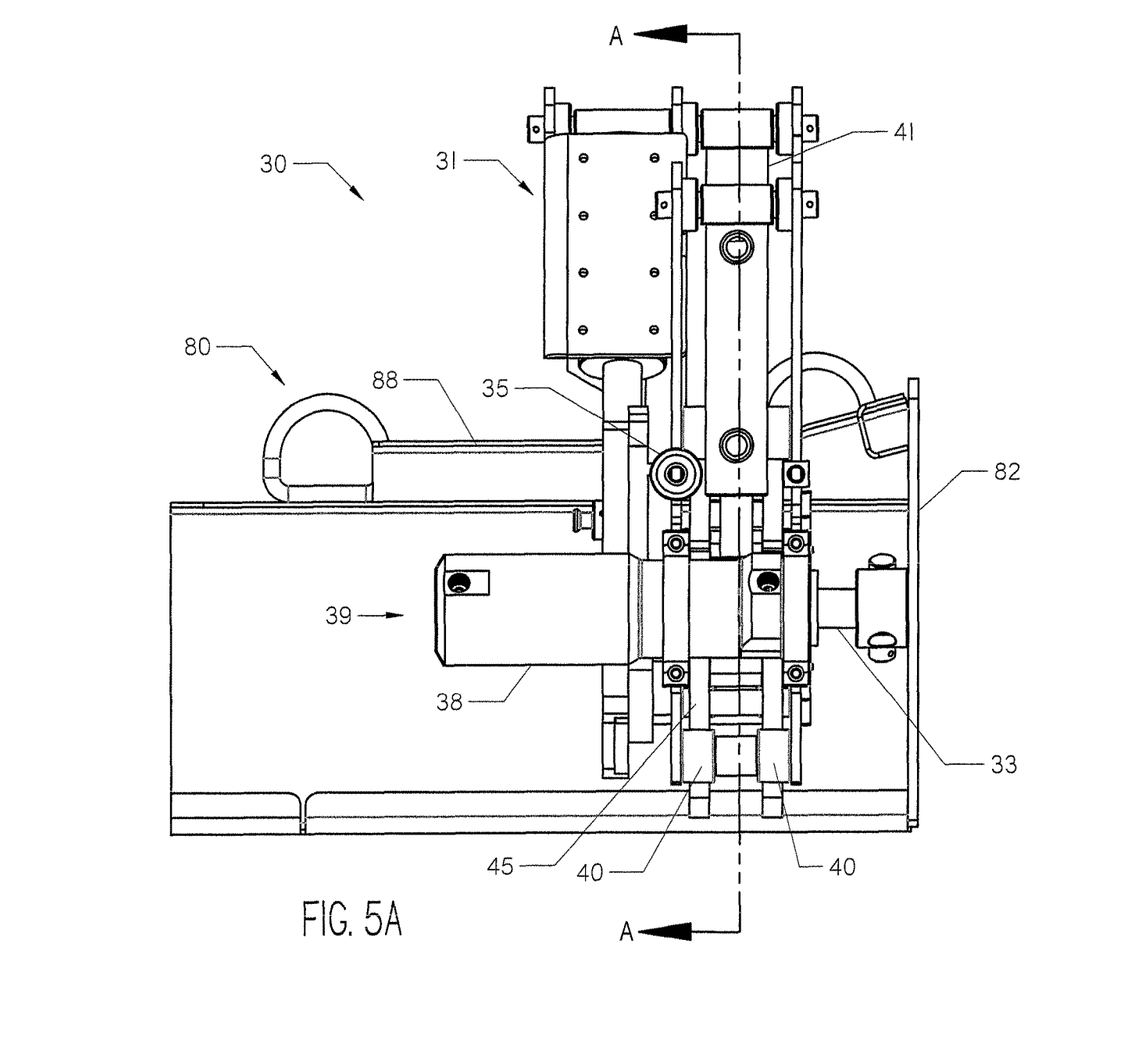
FIG. 5A is a left side view of the extraction machine with a side wall removed. The carriage is retracted and the jaws are in an open position.
Figure 5B:
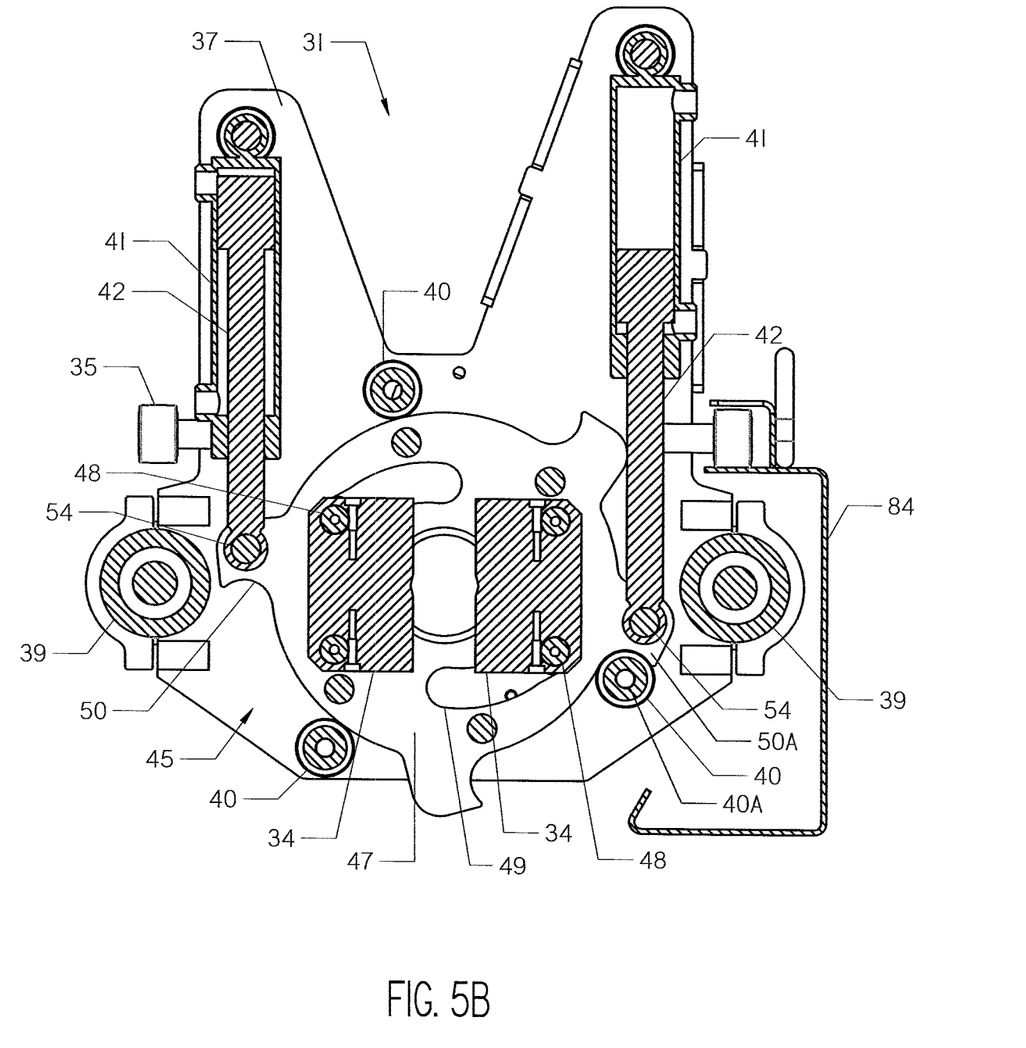
FIG. 5B is a view of the extraction machine along line A-A in FIG. 5A.
Figure 6A:
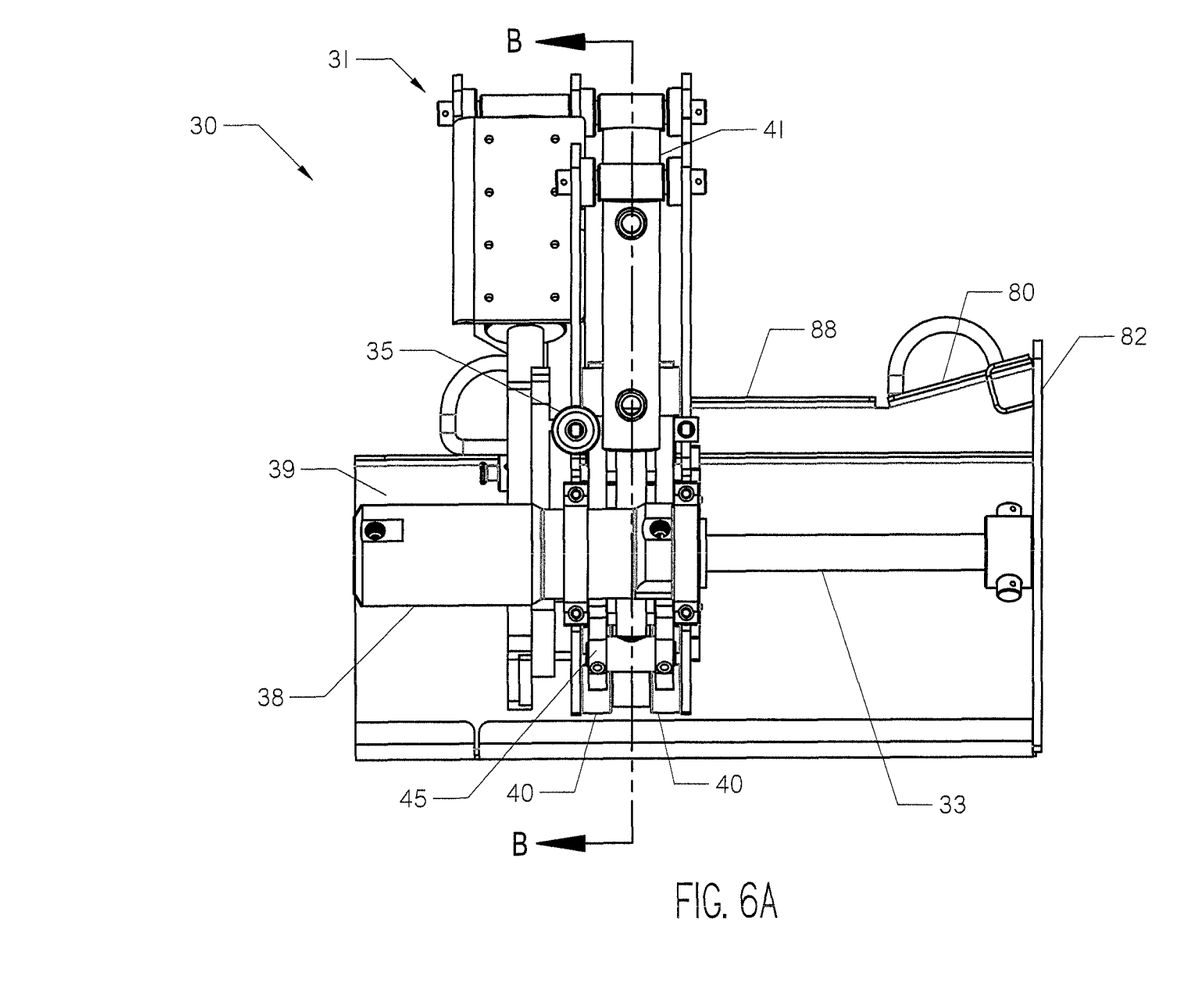
FIG. 6A is a left side view of the extraction machine with a side wall removed. The carriage is extended and the jaws are in the closed position.
Figure 6B:
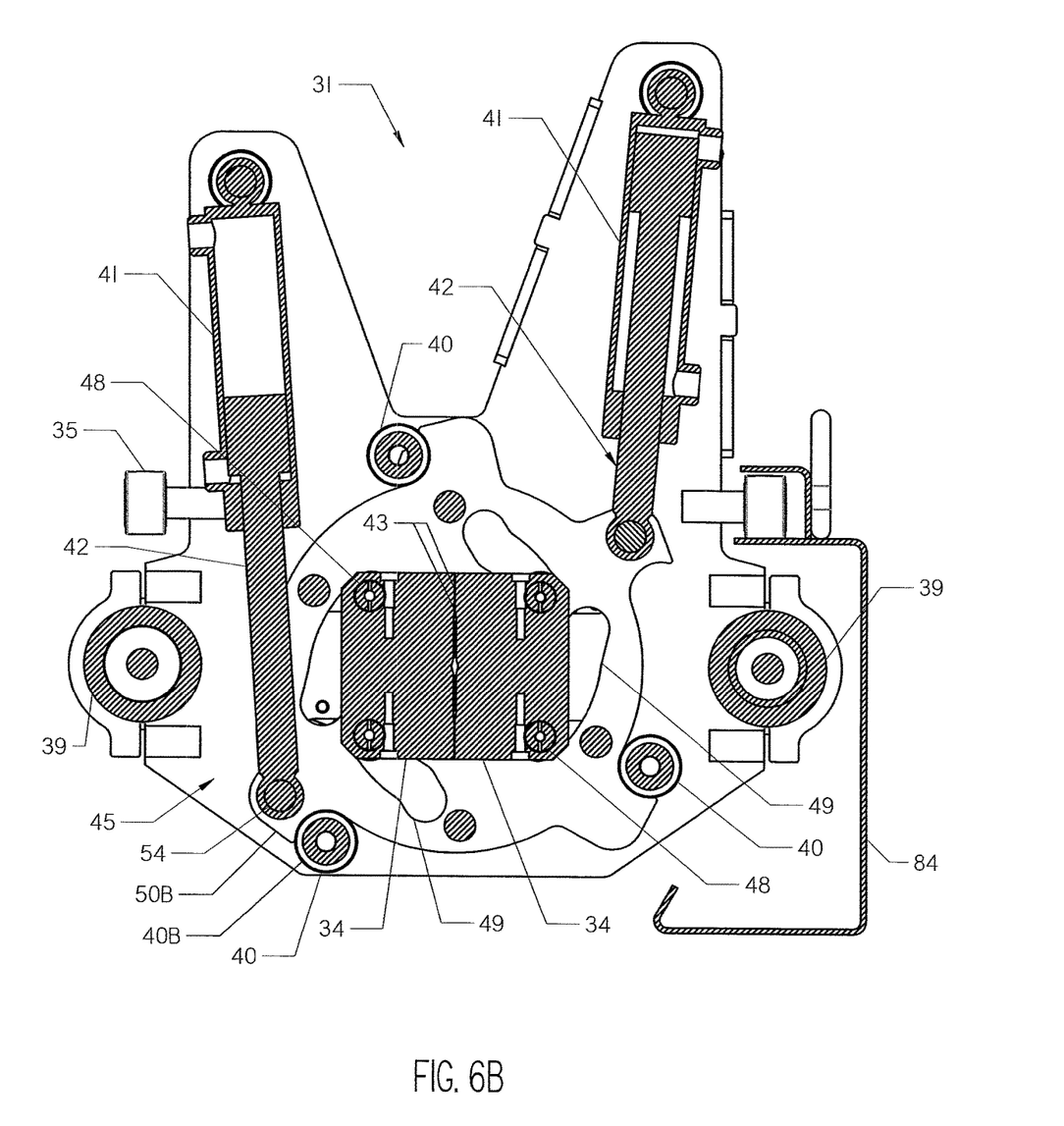
FIG. 6B is a view of the extraction machine along line B-B in FIG. 6A.

The carriage 31 comprises a carriage frame 37, two or more pipe cam cylinders 41, and a clamp mechanism 45 (FIG. 5) supported by the frame and actuated by the pipe cam cylinders. The carriage 31 generally defines a central pipe throat 32 for location of the pipe 14 during extraction.

The hull 80 comprises a reaction plate 82, side walls 84, and a wheel guide 88. The actuators 39 extend between the carriage 31 and the reaction plate 82. The reaction plate 82 defines a pipe service slot 85 that allows a pipe into the extraction machine 30. Side walls 84 are generally orthogonal to the reaction plate 82 and have an upper surface 83 that is generally oriented horizontally. The wheel guide 88 is on and above the upper surface 83. The machine carriage 31 comprises wheels 35 which extend from the carriage into a slot defined by the wheel guide 88 and the upper surface 83.

The wheels 35 support the carriage structure 31. The wheels 35 cause the carriage 31 to be movable relative to the hull 80 through operation of the actuators 39 in a direction parallel to a pipe 14 (FIG. 1) being extracted. The hull 80 may have one or more lift points 81 for attachment to a chain or strap to move the extraction machine 30.

The carriage 31 comprises a pipe shear 60 and a clamp mechanism 45 having jaws 34. The clamp mechanism 45 is preferably located between the pipe shear 60 and the reaction plate. In this way a pipe 14 (FIG. 1) may be held by the jaws 34 while the pipe is being cut by the pipe shear 60.

Figure 4A:
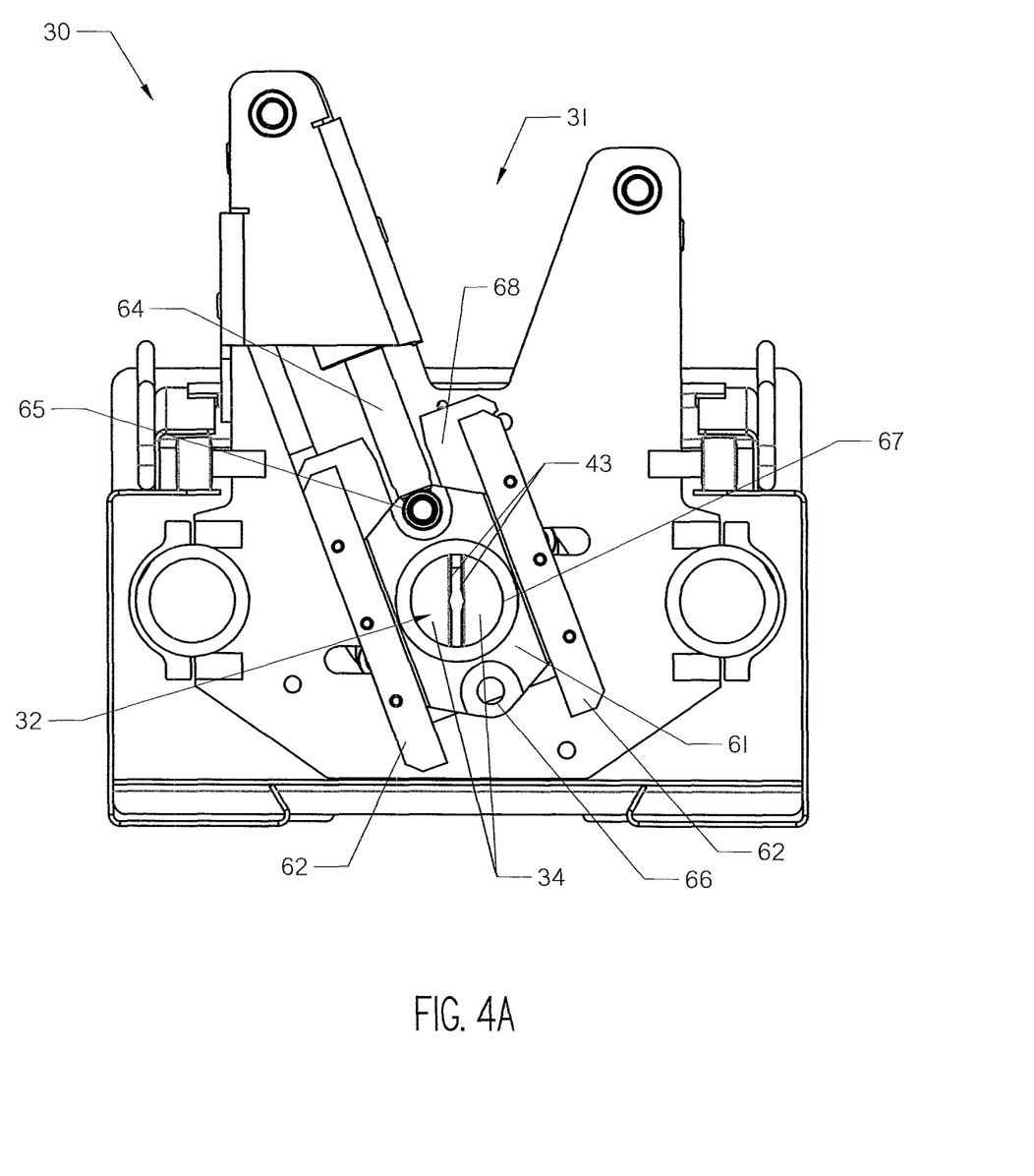
FIG. 4A is a front plan view of the extraction machine of FIG. 2, with the pipe shear in an open position.
Figure 4B:
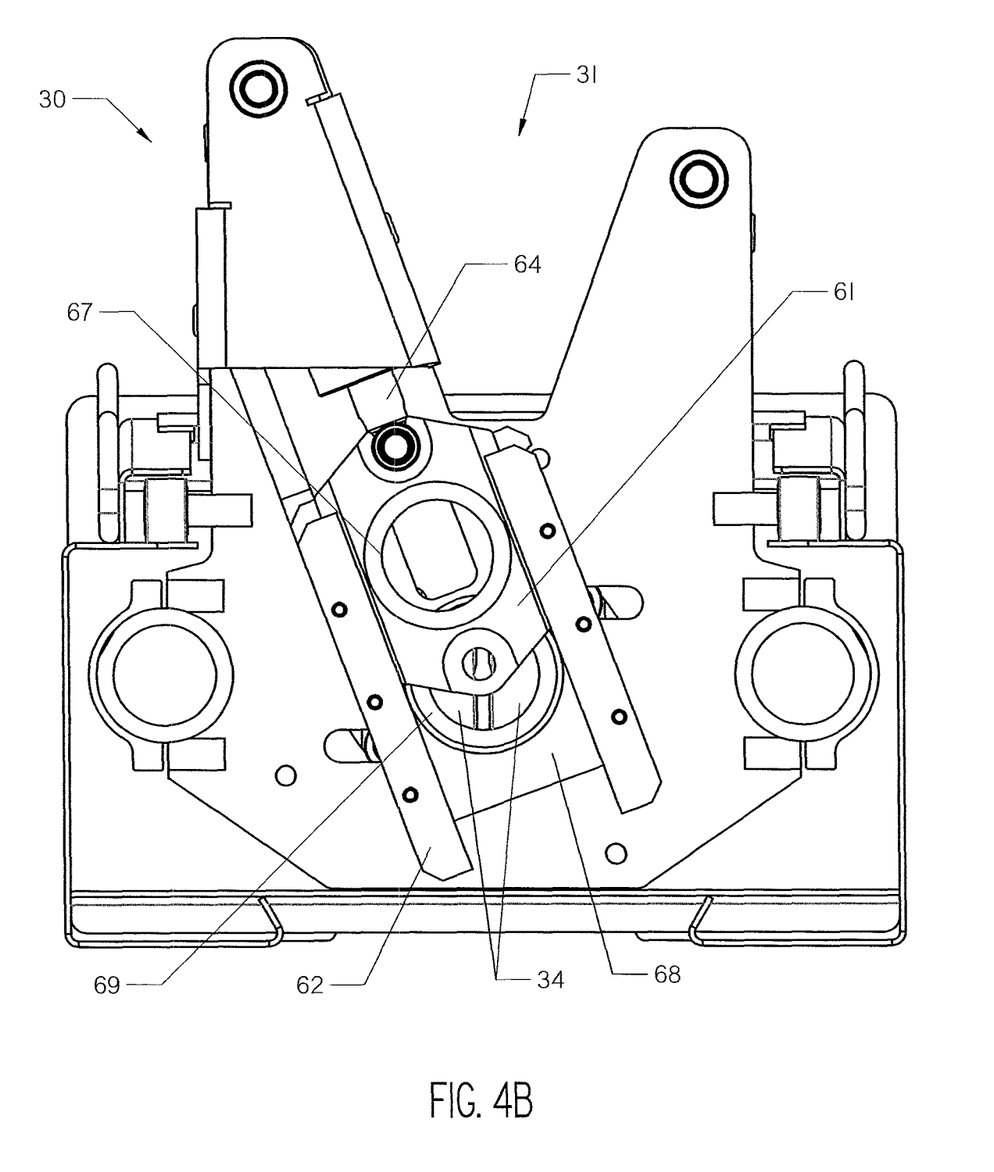
FIG. 4B is the front plan view of FIG. 4A, with the pipe shear in a cutting position.

The pipe shear 60, as shown best in FIGS. 3, 4A and 4B, comprises a shear actuator 64, a movable shear blade 61, guide plates 62 and a fixed shear blade 68. The actuator 64 moves the movable shear blade 61 relative to a pin connection 65 between the actuator and the carriage frame 37. As shown the actuator 64 is a cylinder, though other linear actuators may be used. Guide plates 62 guide the shear blade 61 as it moves slidably relative to the fixed shear blade 68.

The movable shear blade 61 comprises a flat member having a closed opening formed therein. Preferably, the opening is circular in shape and includes a sharpened edge 67. The fixed shear blade 68 likewise comprises a flat member with a closed opening formed therein. The opening is preferably circular in shape and includes a sharpened edge 69. The openings of blades 61, 68 are alignable. When aligned, the openings are concentric. These openings are aligned with a pipe throat 32 as shown in FIG. 4A. A pipe 14 enters the pipe throat 32 and passes between jaws 34 and the openings of blades 61, 68.

Through movement of the shear actuator 64, the moving shear blade 61 slides relative to the fixed shear blade 68. The sharpened edges 67, 69 of blades 61, 68 move out of alignment as in FIG. 4B. A pipe or cable within the openings is therefore cut.

The movable shear blade 61 may include a plurality of eyes 66. These eyes 66 permit inversion or other repositioning of the movable blade 61 relative to the fixed blade 68. As portions of the movable blade 61 become dull, such repositioning can bring sharper portions of the blade 61 into use. The fixed shear blade 68 may be removable from the carriage 31 for repairs, replacement, or sharpening.

With specific reference to FIGS. 5A-7B, the clamp mechanism 45 comprises the pipe clamp jaws 34, a first cam plate 46, a second cam plate 47 and pipe cam cylinders 41. The plates 46, 47 are two similar heavy plates surrounding the central pipe throat 32. These plates 46, 47 are connected by one or more pins 55. The pins 55 may be plugs welded to the plates.

The pipe cam cylinders 41 each have an extendable rod 42. The rods 42 attach at pins 54. When the rods 41 extend and retract, the plates 46, 47 rotate around the pipe throat 32. The cam plates 46, 47 ride on wheels 40 that facilitate rotation around the pipe throat. The wheels 40 are supported by the carriage frame 37.

The pipe cam cylinders 41 operate out of sequence, such that when the cylinder rod 42 of one cylinder is extending, the corresponding cylinder rod of the other is retracting. The pipe cam cylinders 41 are each substantially vertical. In one embodiment, the pipe cam cylinders 41 are no more than 45 degrees from a vertical orientation.

The pipe clamp jaws 34 are disposed between the plates 46, 47. The pipe clamp jaws 34 each comprise a crush face 43. Preferably, the crush face 43 is durable and rough to increase the frictional force between the jaws 34 and a pipe. The crush faces 43 of the jaws 34 are situated in parallel and relationship.

Figure 7A:
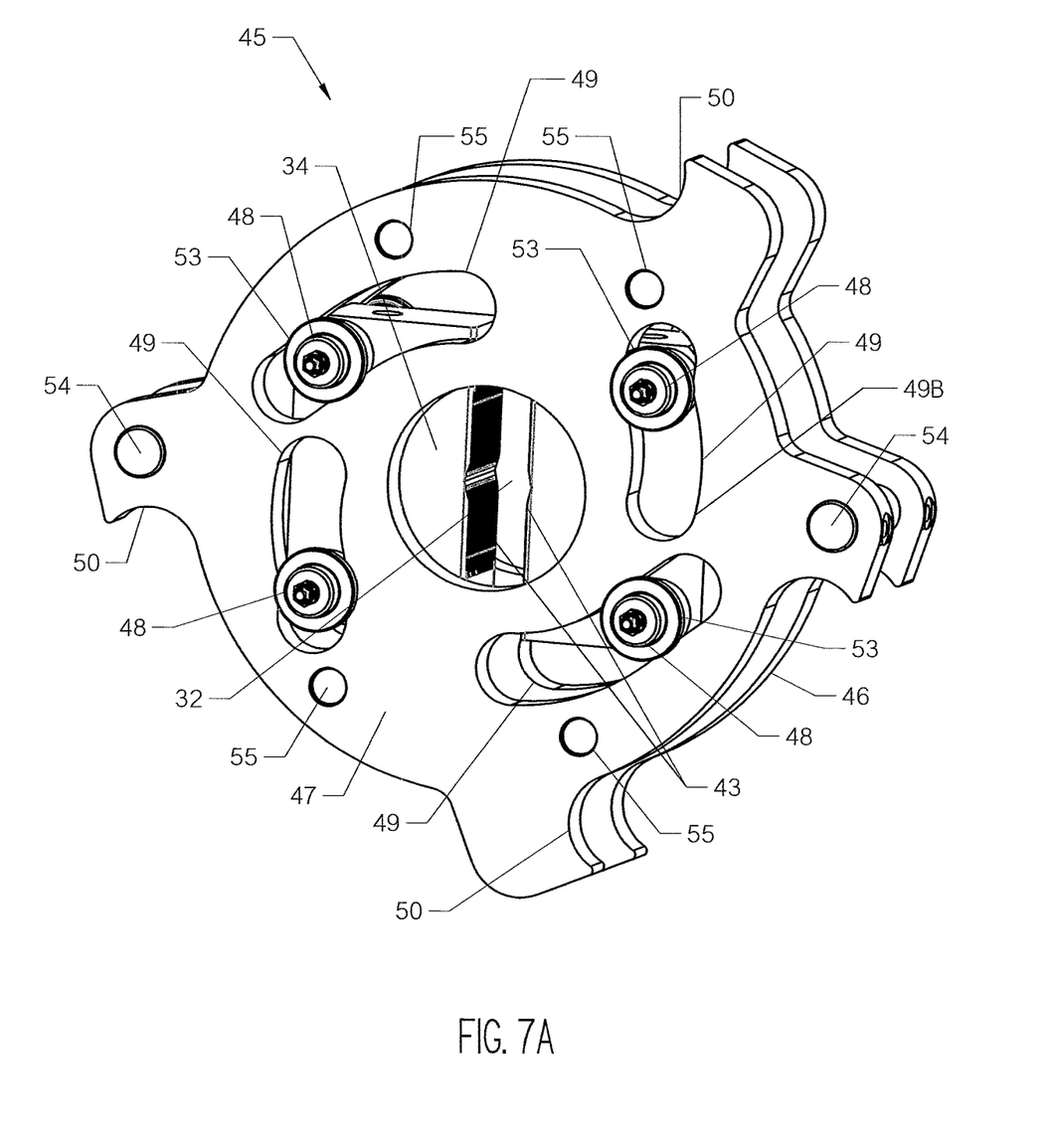
FIG. 7A is a top right view of a clamp mechanism for use in the extraction machine, with jaws in a partially closed position.
Figure 7B:
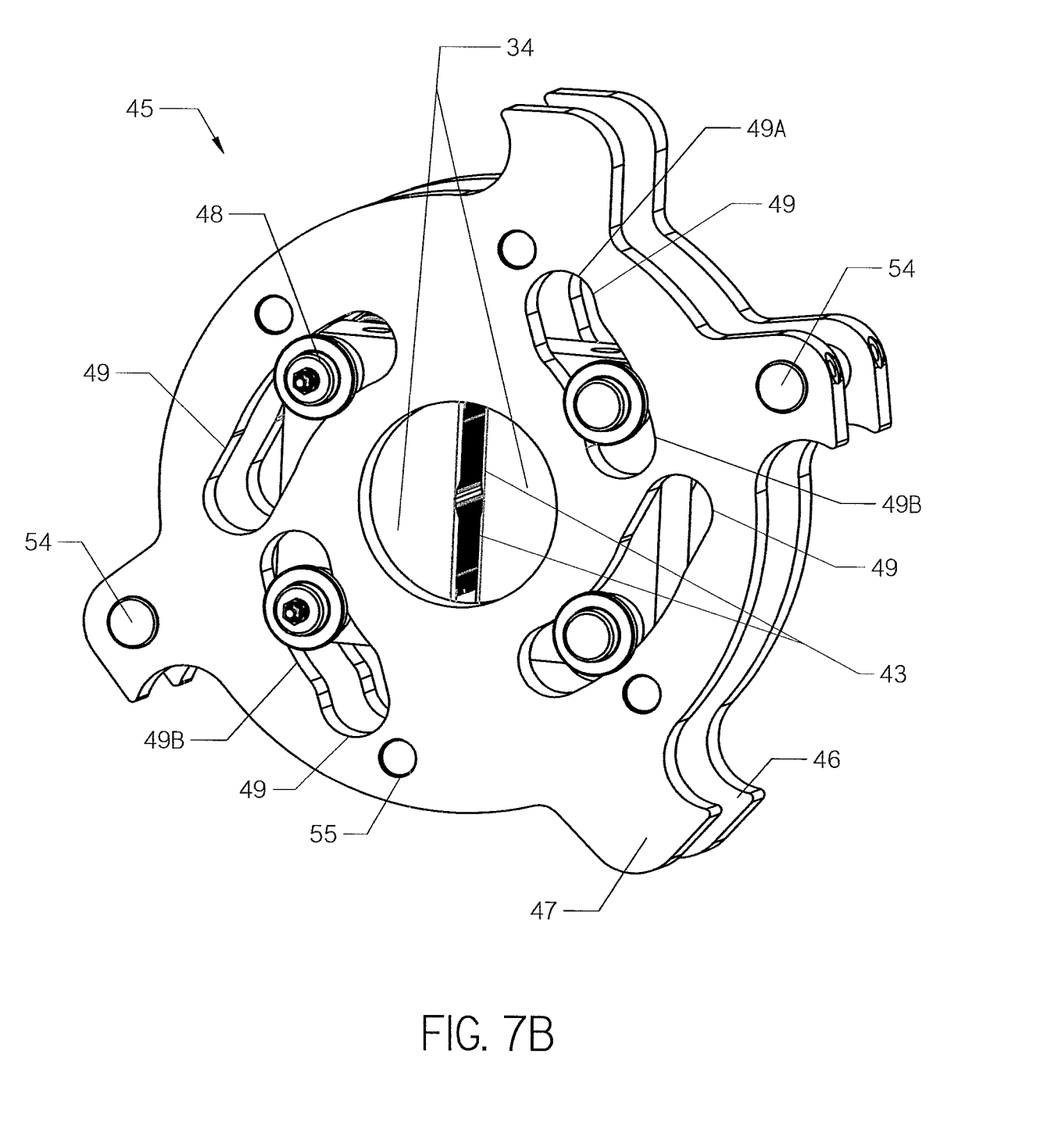
FIG. 7B is a top right view of the clamp mechanism of FIG. 7A with the jaws closed more fully than in FIG. 7A.

Each of the pipe clamp jaws 34 has a follower pin 48 in its upper and lower corner furthest from the pipe throat 32. Each of the first cam plate 46 and second cam plate 47 define curved cam path grooves 49. The pins 48 are disposed through cam path grooves 49.

The pins 48 may comprise one or more bushings 53. The bushings 53 facilitate ease of movement of the pins 48 within the associated grooves during operation of the clamp mechanism 45. Pins 48 may include grease fittings for the same purpose.

With reference again to FIG. 2, a face plate 56 is a part of the carriage frame 37. As shown, the face plate 56 faces the reaction plate 82 of the hull 80. Four horizontal or rectilinear tracks or grooves 58 are formed in the carriage frame 37. In one embodiment, the grooves 58 are in the face plate 56. Follower pins 48 extend through the face plate 56 at these grooves 58. Motion of the follower pins 48 are restricted to the horizontal grooves 58. A similar face plate (not shown) may be provided on the opposite side of the carriage 31.

Grooves 58 are stationary and parallel. The grooves 58 maintain a position of the pins 48 relative to the face plate 56. The grooves 58 coordinate to keep the crush faces 43 of the jaws 34 parallel and vertical. Grooves 49 cause the pins 48 to move closer or further from the pipe throat 32. Any cam surface, such as cam groove 49, may be utilized to engage the pins 48.

As plates 46 and 47 are rotated, the jaws 34 move in opposing directions. Depending on the rotational direction of the plates 46, 47, the jaws either move toward or away from the center of the throat 32. When actuated toward one another, the jaws 34 coordinate to crush or pinch a pipe (not shown) disposed within the pipe throat 32 from two sides.

As shown in FIGS. 4B and 5B, clockwise rotation of the plates 46, 47 results in the jaws 34 moving away from one another. Counter-clockwise rotation of the plates 46, 47 results in the jaws 34 moving toward one another. The clock directions of plate rotation that produce these jaw motions may be reversed if desired.

As shown best in FIGS. 7A and 7B, the groove 49 may have two portions. A first portion 49A, which contains the follower pin 48 when the jaws 34 are open, is short and steep. Thus, when the plates 46, 47 are rotated with the pin 48 in this portion, 49A, modest forces are applied at the jaw crushing faces 43 while using little of the available plate 46, 47 rotation.

A second portion 49B is less steep, such that the jaws 34 move less with a higher angular travel of the plates 46, 47. Thus, greater force is provided by the pipe cam cylinders 41 to the jaws 34 and their crush faces 43 when the pin is within second portion 49B.

The cam plates 46, 47 comprise peripheral hooks 50. The hooks 50 block peripheral movement of the wheels 40 around the cam plates 46, 47. For example, in FIG. 5B, contact between a hook 50A and wheel 40A prevents further rotation in the clockwise direction. In this position, the jaws 34 are at their maximum distance from one another. Similarly, in FIG. 6B, a hook 50B contacts wheel 40B, preventing further rotation in the counter-clockwise direction.

If a pipe (not shown) is within the pipe throat 32 and fully crushed, the space between opposing crush faces 43 will be approximately two wall thicknesses. In one embodiment, the hooks 50 will block peripheral movement of the wheels 40 (FIGS. 4B, 5B) only when the crush faces 43 are less than two wall thicknesses apart. The clamp mechanism 45 can therefore continue to apply force to the crushed pipe even when the pipe is fully crushed.

In operation, a pipe 14 to be extracted is disposed through the pipe throat 32 of the carriage 31. The actuators 39 are preferably unextended as shown in FIG. 5A, and the jaws 34 are open. The reaction plate 82 of the hull 80 is secured against the face 21 of the pit 12.

The pipe cam cylinders 41 rotate the cam plates 46, 47 to close the jaws 34. Rotation of the cam plates 46, 47 causes the pins 48 to travel in grooves 58 of the face plate 56. Thus, the jaws 34 close in the pipe throat 32, crushing the pipe 14 with substantially equal and aligned forces on opposite sides of the pipe.

Figure 9A:
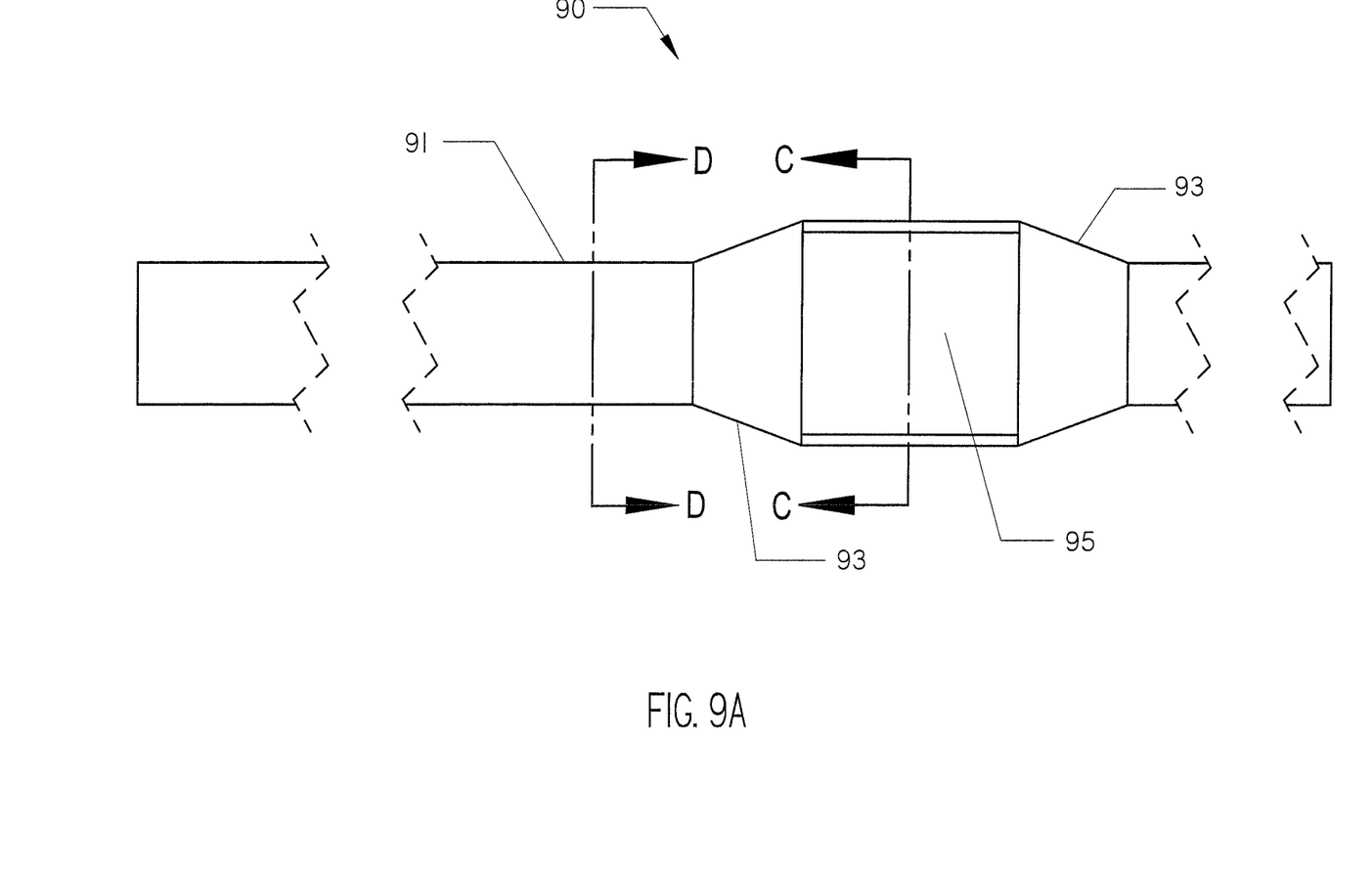
FIG. 9A is a side view of a pipe having been crushed by the jaws.
Figure 9B:
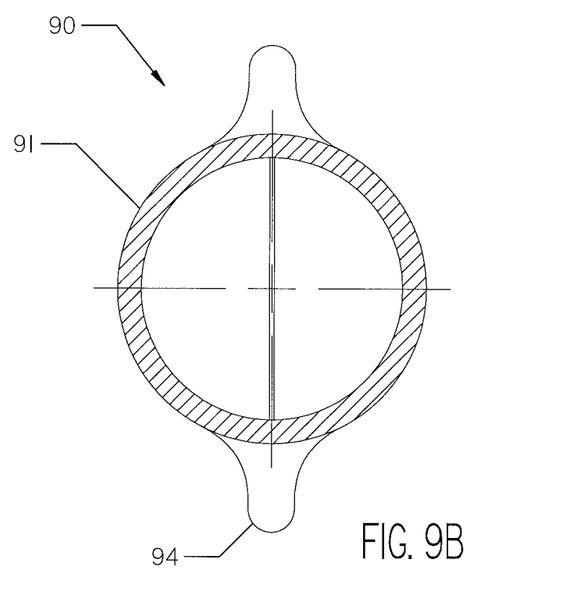
FIG. 9B is a sectional view of the pipe of FIG. 9A along section D-D.
Figure 9C:
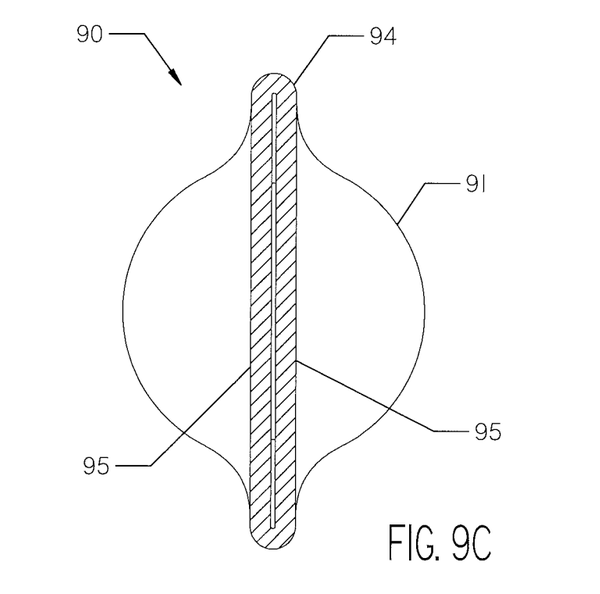
FIG. 9C is a sectional view of the pipe of FIG. 9A along section C-C.

The resulting pipe shape is shown in FIGS. 9A, 9B and 9C. In these figures, a zone 90 of ductile pipe 14 has been crushed and flattened by clamp jaws 34. The zone 90 has an undeformed area 91, a transition zone 93, and a flattened area 94. The flattened area 94 has contacted the pipe jaws 34 through the entire width of the flattened area. The transition zones 93, located on either side of the flattened area 94, transition the pipe 14 from the undeformed area 91 to the fully flattened profile 94.

During the next stage of operation, the jaws 34 remain closed and continue to exert force on the parallel surfaces 95. The carriage 31 is pushed away from the reaction plate 82 by the actuators 39. The pipe 14 is accordingly pulled with the carriage 31 out of the ground. The pipe 14 is held by the friction between the flattened area 94 and the actuated jaws 34. If the pipe should slip within the jaws 34 at the flattened area 94, such slippage should be limited by engagement of the adjacent transition area 93 with the jaws 34. Thus, if the force required to extract the pipe exceeds the frictional limit of the flattened area 94, the pipe remains engaged with the moving carriage 31 at the transition area 93.

When the actuators 39 are at their full stroke, the pipe shear 60 may be activated to shear off the length of pipe 14 that has been extracted. The jaws 34 are then released by rotating the cam plates 46, 47 in the opposite direction. The actuators 39 may then retract, pulling the carriage 31 back towards the reaction plate 82 for a subsequent stroke.

The machine 30 therefore breaks the initial friction between the pipe 14 and the soil 20 without the use of a cable or strand within the pipe 14. The clamp force of jaws 34 is sufficient to hold the pipe 14 during initial and subsequent strokes of the carriage 31.

The foregoing steps are repeated until the pipe is fully extracted from beneath the ground. Removed segments of pipe may be discarded.

Optionally, a new pipe 16 (FIG. 1) may be pulled behind the pipe 14, with the new pipe 16 following the path of the old pipe 14. Because no strand extends through the pipe 14, the new pipe 16 must be interconnected with the pipe 14.

Figure 8:
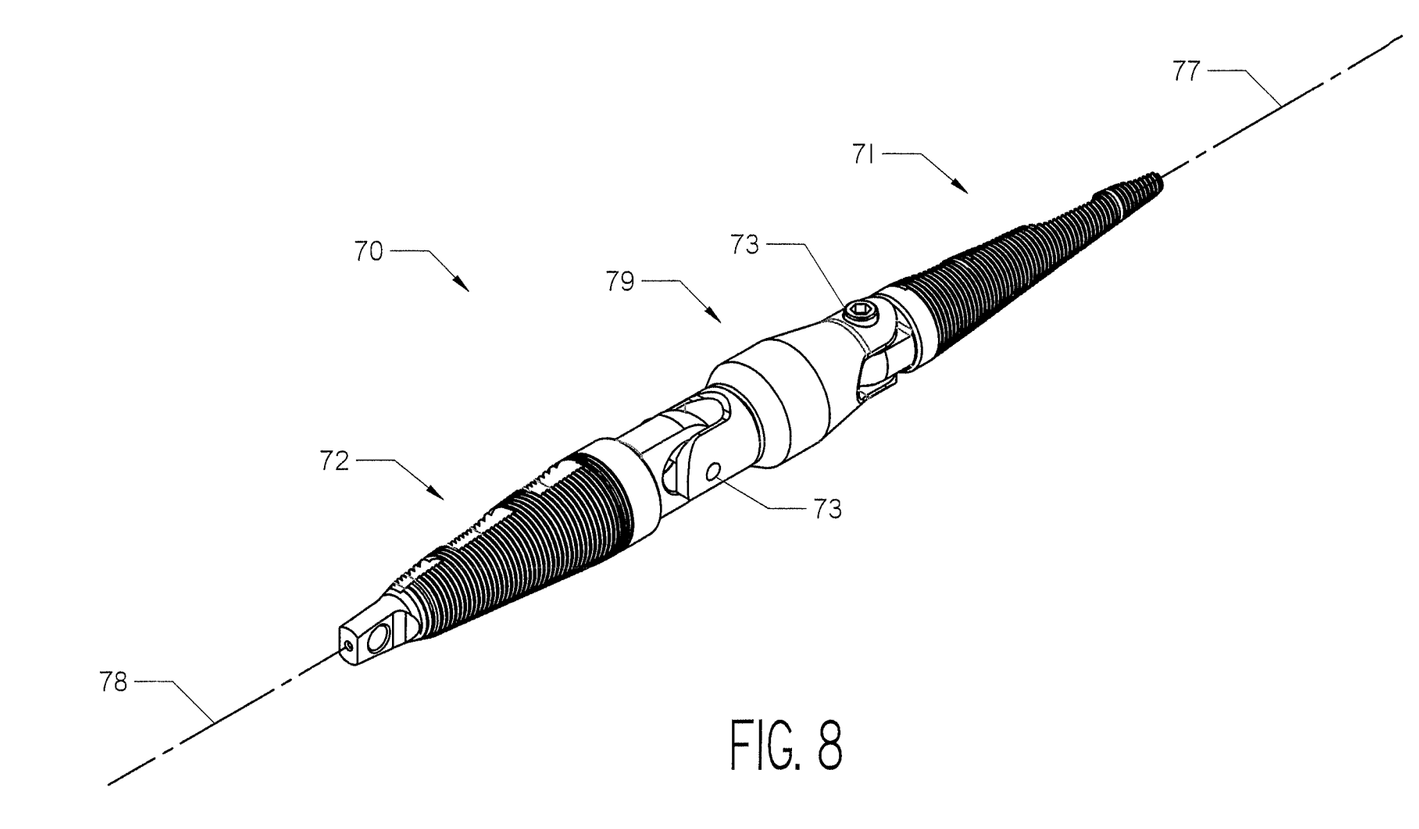
FIG. 8 is a top right side view of a pipe puller.

With reference to FIG. 8, the pipe puller 70 is shown. The pipe puller 70 has a front puller 71 and a rear puller 72 connected by a pivot 73. The pivot 73 allows the pipe puller 70 to accommodate bends. As shown, the pivot 73 comprises two pivot points, each allowing the pipe puller 70 to pivot about a different axis. In one embodiment, shown in the figures, those axes are perpendicular to one another.

The front puller 71 may be threaded into a back end of the pipe 14 being pulled by machine 30. A new product pipe (not shown) may be likewise attached or threaded to the rear puller 72. An expander 79 may be utilized between the pullers 71, 72 to increase a diameter of a resulting bore. In one embodiment, the expander may increase the diameter of the resulting bore to 20% or more of the diameter of the new pipe 16.

The pipe 14 is extracted along its path 78. The new pipe 16 can be installed along a similar path 77 as the pipe 14 is being extracted. The simultaneous extraction and installation along similar paths minimizes disruption to other buried lines.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:
1. A system comprising:
   a pipe having a first end, a second end, and a middle section, the middle section being underground; and
   an apparatus comprising:
      a support structure; and
      a carriage movable relative to the support structure and comprising a plurality of second slots, the carriage comprising:
         a pipe clamp assembly having a first jaw and a second jaw disposed on opposite sides of the first end of the pipe and comprising:
            a rotatable plate characterized by a plurality of first slots;
            a first pin disposed through the first jaw, one of the plurality of first slots, and one of the plurality of second slots; and
            a second pin disposed through the second jaw, one of the plurality of first slots, and one of the plurality of second slots;
         wherein the first jaw may be moved toward the second jaw into a closed position, such that the jaws place a crushing force on the first end of the pipe when in the closed position; and a cylinder disposed between the support structure and the carriage for providing a thrust force to the pipe when the jaws are in the closed position;

wherein the crushing force is more than five times greater than the thrust force.

2. The system of claim 1 wherein the pipe defines a length of greater than thirty feet from the first end of the pipe to the second end of the pipe.

3. The system of claim 1 wherein the crushing force is between seven and ten times greater than the thrust force.

4. The system of claim 1 wherein the pipe defines a length of greater than fifty feet from the first end of the pipe to the second end of the pipe.

5. The system of claim 1 in which the crushing force is between 100 and 140 tons.

6. The system of claim 1 in which no cable is situated within the pipe at any time.

7. The system of claim 1 in which the carriage further comprises a blade for cutting the pipe at its first end, in which no cable is situated within the pipe when the blade cuts the pipe at the first end.

8. A system comprising:
a pipe having a first end, a second end, and a middle section, in which the middle section is below ground; and
an apparatus comprising:
a stationary support structure; and
a carriage movable relative to the stationary support structure comprising:
a carriage frame;
a pipe clamp assembly supported by the carriage frame and characterized by a first jaw and a second jaw, each of the first jaw and second jaw having a crush face parallel to the crush face of the other jaw; and
an actuator to move the first jaw in a first direction and to move the second jaw in a second direction while maintaining the crush faces in a parallel orientation, wherein the first and second directions are directly opposite each other and wherein the actuator comprises a first cylinder oriented no more than 45 degrees from vertical;
in which the pipe is disposed within the apparatus such that the pipe is between the first jaw and the second jaw and in a crushed condition when the jaws are fully extended.

9. The system of claim 8 in which no cable is situated in the pipe.

10. The system of claim 8 in which the pipe is defined by a pipe wall, in which a first portion of the pipe wall is parallel to and contacting a second portion of the pipe wall when the pipe is in the crushed condition.

11. The system of claim 8 in which the actuator extends and retracts in a third direction, in which the third direction is not parallel to the first direction or the second direction.

12. The system of claim 8 in which the carriage frame defines a plurality of rectilinear slots and in which the pipe clamp assembly comprises:
a plate rotatable relative to the carriage frame, the plate comprising a plurality of curved slots;
a first pin disposed through the first jaw, one of the plurality of curved slots, and one of the plurality of rectilinear slots; and
a second pin disposed through the second jaw, one of the plurality of curved slots, and one of the plurality of rectilinear slots.

13. The system of claim 12 in which the actuator comprises a second cylinder, wherein the first cylinder and the second cylinder are disposed between the carriage frame and the plate.

14. An apparatus comprising:
a support structure; and
a carriage movable relative to the support structure comprising:
a carriage frame comprising a plurality of second slots; and
a pipe clamp assembly supported by the carriage frame and comprising:
a rotatable plate characterized by a plurality of first slots; and
a first jaw and a second jaw;
a first pin disposed through the first jaw, one of the plurality of first slots, and one of the plurality of second slots; and
a second pin disposed through the second jaw, one of the plurality of first slots, and one of the plurality of second slots.

15. The apparatus of claim 14 in which the first slots are curved.

16. The apparatus of claim 15 in which the first slots have a non-uniform radius of curvature.

17. The apparatus of claim 14 in which the second slots are rectilinear.

18. The apparatus of claim 14 further comprising an actuator to rotate the plate relative to the carriage frame.

19. The apparatus of claim 18 in which the actuator is a cylinder oriented no more than 45 degrees from vertical.

20. The apparatus of claim 14 in which the carriage further comprises:
a pipe shear disposed on the carriage frame, the pipe shear comprising a blade.

21. The apparatus of claim 20 in which the blade comprises a flat member within which a circular opening is formed.

22. The apparatus of claim 14 in which the plate is characterized as a first plate, and in which the pipe clamp assembly comprises:
a second plate characterized by a plurality of third slots;
in which the first pin and the second pin are disposed through one of the plurality of third slots of the second plate.

23. The apparatus of claim 22 in which the jaws are disposed between the first plate and the second plate.

24. The apparatus of claim 23 in which the first plate and the second plate are connected by fixed pins.

25. The apparatus of claim 14 further comprising an actuator to rotate the plate relative to the carriage frame, the actuator comprising:
a first cylinder that interconnects the carriage frame and the plate; and
a second cylinder that interconnects the carriage frame and the plate.

26. The apparatus of claim 14 further comprising at least one carriage cylinder, the at least one carriage cylinder extending between the support structure and the pipe clamp assembly.

27. The apparatus of claim 14 in which the pipe clamp assembly further comprises a plurality of wheels disposed on the carriage frame and contacting the plate at a periphery of the plate.

28. The apparatus of claim 27 in which the periphery of the plate includes at least one concavity that conforms to a portion of a periphery of one of the wheels.

29. A method of treating a pipe comprising:
positioning the apparatus of claim 14 such that the pipe is situated between the first and second jaws;
rotating the plate until the pipe is gripped between the first and second jaws; and
moving the carriage relative to the support structure while the pipe remains gripped by the jaws.

30. The method of claim 29 further comprising shearing away a portion of the pipe after moving the carriage relative to the support structure, while the pipe remains gripped between the jaws.

31. The method of claim 29 further comprising:
rotating the plate until the pipe is no longer gripped between the first and second jaws; and
moving the carriage relative to the support structure while the pipe remains ungripped between the jaws.

32. A system comprising:
a pipe having a first end, a second end and a middle section, in which the middle section is below ground; and
the apparatus of claim 14;
in which the pipe is disposed within the apparatus such that the pipe is between the first jaw and the second jaw.

33. The system of claim 32 in which the carriage further comprises:
a pipe shear disposed on the carriage frame, the pipe shear comprising a blade;
in which the blade comprises a flat member within which a circular opening is formed.

34. The system of claim 32 in which no cable is situated within the pipe.

35. The system of claim 32 in which the pipe is characterized as a first pipe and further comprising:
a second pipe; and
a pipe puller disposed at the second end of the first pipe and connected to the second pipe.

36. The system of claim 35 in which the pipe puller is threaded to the second end of the first pipe and is threaded to the second pipe.

37. The system of claim 32:
in which the first jaw and second jaw are movable between open and closed positions;
in which the pipe is defined by a wall thickness; and
in which the closed jaws have no more than a separation distance of two wall thicknesses.

38. An apparatus comprising:
a stationary apparatus frame; and
a carriage supported by the apparatus frame and movable relative thereto, the carriage comprising:
a carriage frame within which a rectilinear track is formed; and
a pair of opposed jaws movable between open and closed positions, the jaws comprising:
a first jaw having a first follower riding in the track; and
a second jaw having a second follower riding in the track; and
a rotatable plate having one or more cam surfaces disposed such that each follower is continuously engaged by a single one of the one or more cam surfaces as the plate is rotated.

39. The apparatus of claim 38 in which a centrally disposed opening is formed in the plate.

40. The apparatus of claim 38 in which a plurality of rollers are supported by the carriage frame and engage a peripheral edge of the plate.

* * * * *